(12) United States Patent
     Zaloom

(10) Patent No.: US 9,778,700 B2
(45) Date of Patent: Oct. 3, 2017

(54) INTEGRATED PEN HOLDER FOR TABLET COMPUTERS AND PERSONAL DISPLAY AND INPUT DEVICES

(71) Applicant: Joseph A. Zaloom, Falls Church, VA (US)

(72) Inventor: Joseph A. Zaloom, Falls Church, VA (US)

(73) Assignee: JZM Intellectual Holdings, Inc., Falls Church, VA (US)

( * ) Notice: Subject to any disclaimer, the term of this patent is extended or adjusted under 35 U.S.C. 154(b) by 0 days.

(21) Appl. No.: 15/257,638

(22) Filed: Sep. 6, 2016

(65) Prior Publication Data

US 2017/0102739 A1    Apr. 13, 2017

Related U.S. Application Data

(60) Provisional application No. 62/239,687, filed on Oct. 9, 2015.

(51) Int. Cl.
| | |
|---|---|
| *G06F 1/16* | (2006.01) |
| *G06F 3/0354* | (2013.01) |
| *G06F 3/039* | (2013.01) |
| *F16B 1/00* | (2006.01) |

(52) U.S. Cl.
   CPC ........... *G06F 1/1656* (2013.01); *G06F 3/039* (2013.01); *G06F 3/03545* (2013.01); *F16B 2001/0035* (2013.01); *G06F 3/03542* (2013.01); *G06F 2200/1632* (2013.01)

(58) Field of Classification Search
   USPC .......... 211/69.1, 69.2, 69.3, 69.4, 69.5, 69.8, 211/69.9; 248/442.2; 206/564, 565; 345/179, 180
   See application file for complete search history.

(56) References Cited

U.S. PATENT DOCUMENTS

| | | | | |
|---|---|---|---|---|
| 4,865,285 A * | 9/1989 | Gaggianese | ......... | B43M 99/004 211/69.1 |
| 5,422,442 A * | 6/1995 | Gouda | .................. | A45C 15/00 178/19.01 |
| 7,061,762 B2 * | 6/2006 | Canova, Jr. | ........... | G06F 1/1626 178/19.01 |
| 8,493,368 B2 * | 7/2013 | Hsieh | .................. | G06F 3/03545 178/19.01 |
| 2006/0109617 A1 * | 5/2006 | Chen | ..................... | G06F 1/1626 361/679.55 |
| 2016/0255931 A1 * | 9/2016 | Nakagawa | ........... | A45C 13/001 |

* cited by examiner

*Primary Examiner* — Alfred Wujciak
(74) *Attorney, Agent, or Firm* — Nixon & Vanderhye P.C.

(57) ABSTRACT

A sheath, or an encapsulated sheath, within tablet computers, smart phones, and similar electronic devices, or with enclosures for such electronic devices that would enable the seamless latching and unlatching of electronic pens of various sizes and thicknesses to such devices, or enclosures to such devices, through the pens' integrated flexible clips.

6 Claims, 9 Drawing Sheets

INTEGRATED PEN HOLDER FOR TABLET COMPUTERS AND PERSONAL DISPLAY AND INPUT DEVICES

CROSS-REFERENCE TO RELATED APPLICATION

This application claims the benefit U.S. Provisional Patent Application No. 62/239,687 filed Oct. 9, 2015, which is incorporated herein by reference.

TECHNICAL FIELD

The technology herein relates to a mechanical design for the efficient attachment and detachment of electronic pens and pencils of various sizes and thicknesses to electronic tablets, computers, personal information devices and other display and input devices of various sizes and thicknesses.

BACKGROUND OF THE INVENTION

With Microsoft's™ introduction of the Microsoft Pen™ with their line of Surface Pro™ computers in February 2013 and the September 2015 introduction of the Apple Pencil™ for the iPad Pro™, electronic pens and pencils have gone mainstream. Yet, three years after the introduction of the Microsoft Pen™, the way to attach and detach an electronic pen to an electronic tablet remains either through a fabric loop that attaches to the back of the tablet or to the back of a keyboard cover that attaches to the tablet, or more recently, with the introduction of the Microsoft Surface Pro 4™ and the Microsoft Surface Book™, by attaching the pen magnetically to one side of the tablet. However, attaching an electronic pen to a tablet magnetically makes it very easy for the pen to be knocked out, dropped, and lost. Moreover, Apple™ has not announced any attachment mechanism that would secure its Apple Pencil™ to its associated iPad Pro™ in any manner. In fact, the new Apple Pencil™, while an amazing piece of art and technology, does not even include a clip. Without a clip, an electronic pen or pencil is prone to roll over smooth resting surfaces, fall to the ground, and if not noticed, get forgotten and lost.

In addition, losing an electronic pen or pencil that cost anywhere from $50 to $100 may not only be costly, it may also amount to a major nuisance and a substantial loss of productivity until a replacement had been obtained.

Since most electronic tablets designed for professional use, and even new generations of smart phones, are expected to support an electronic pen or pencil in the future, it is only natural to expect that these tablets also include a simple coupling mechanism that would fasten and unfasten such pens and pencils from their associated tablets and smart phones quickly, securely, and conveniently.

SUMMARY OF THE INVENTION

The invention that I conceived and disclose may be embodied to solve one, some, or all of the problems mentioned above by adding a clip with a pointed triangularly shaped protrusion "nose", or depression, at the tip of the clip that is either magnetic or affected by magnetism and a matching, but slightly wider, corresponding well or sheath, at the side of the accompanying electronic tablet that includes a corresponding matching nose or depression. The electronic pen can then be attached "latched" and detached "unlatched" from its accompanying tablet by inserting the pen's clip into the matching sheath that is built into the tablet. The pen can be securely fastened, or latched, into the tablet once the magnetized triangularly shaped protrusion or depression rests in the corresponding metallic protrusion or depression on the side of the sheath or well, making the electronic pen unlikely to slide out of its sheath or well even when the tablet is held upside down.

If this approach is implemented by tablet manufacturers, the length and width of the pen clip and its matching sheath may become standard for all tablet manufacturers thereby allowing interchangeability of electronic pens of various lengths, thicknesses, and manufacturers.

DETAILED DESCRIPTION

Figure 1:
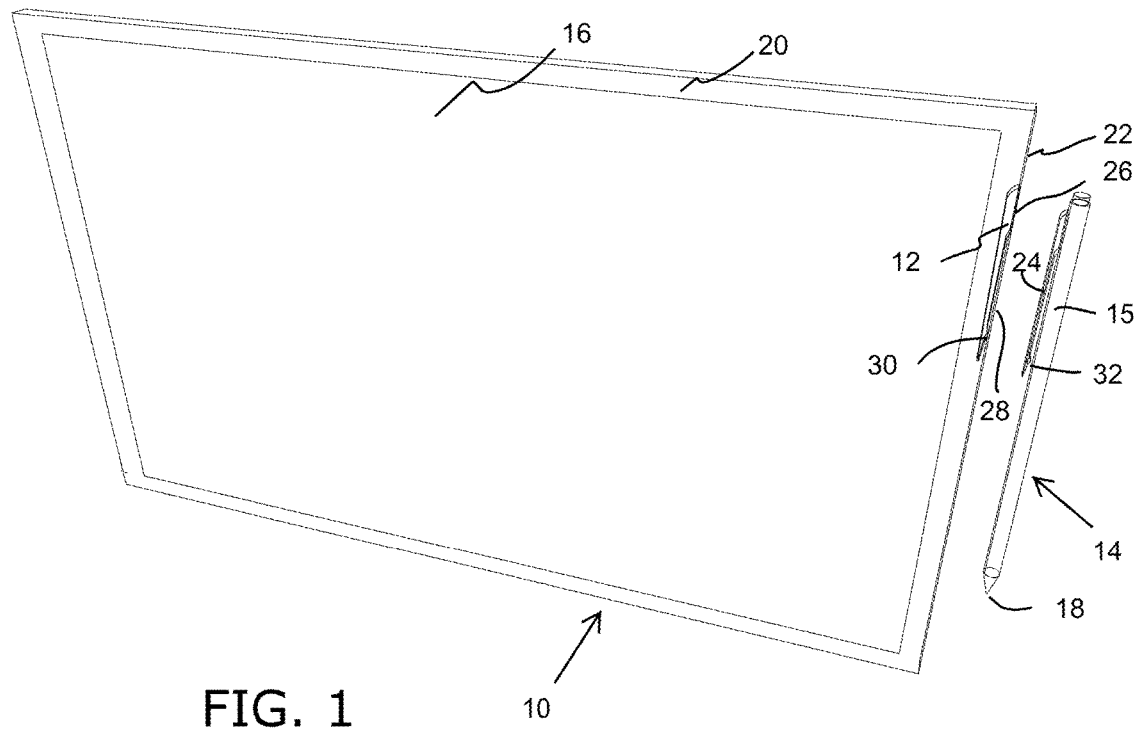
FIG. 1 illustrates a three-dimensional perspective front view of a tablet computer with a sheath and an electronic pen attachable to the latch.

FIG. 1 shows an exemplary electronic tablet computer 10 with a sheath 12 and an electronic pen 14 attachable to the sheath. The tablet computer 10 may have a touch sensitive digital display screen 16 configured to sense as an input the tip 18 of the electronic pen. A tablet computer with a touch sensitive digital display screen may be viewed as conventional for purposes of the disclosure of this invention. The tablet computer may also be a cellular smart phone, personal digital assistant, electronic book or other similar portable electronic device (collectively referred to as an electronic display device) in which an electronic pen may be used as an input device.

The housing 20 for the tablet computer 10 may be formed of plastic or metal and provide a protective casing for the electronic components in the housing and for the display screen 16. The housing includes a side edge 22 that may, for example, have a height of greater than eight inches and a thickness in the range of 3 millimeters to an inch and one half. These dimensions are exemplary and depend on the type, model, and manufacturer of the tablet computer.

The side edge of the housing is configured to include the sheath 12. The sheath may be an elongated slot, chamber, recess or other structure configured to receive the electronic pen. The sheath may be open at both ends, shorter in length, or longer in length than the clip, integrated into the side edge 22 of the housing 20 for the tablet computer, or encapsulated in an enclosure that may be completely independent of the housing 20 of the exemplary electronic tablet 10. The clip 24 of the pen may be made of a pliable material, such as plastic or metal, that can easily bend and slide into an opening 26 of the sheath 12 and enters the sheath. A finger 28 of the sheath slides between the clip 24 and the body of the pen 15. The finger 28 may have a length longer than the length of the clip. A latch 30 on an interior surface of the finger engages an end region 32 of the clip 24. The latch may be a magnet that holds the end region 32 of the clip 24. The latch 30 may be a protrusion or a recess that engages with a nose or a depression on the end region 32 of the clip 24. When secured to the sheath 12, the pen 14 is held to the side edge 22 of the tablet computer by the engagement between the sheath 12 and the clip 24.

Figure 2:
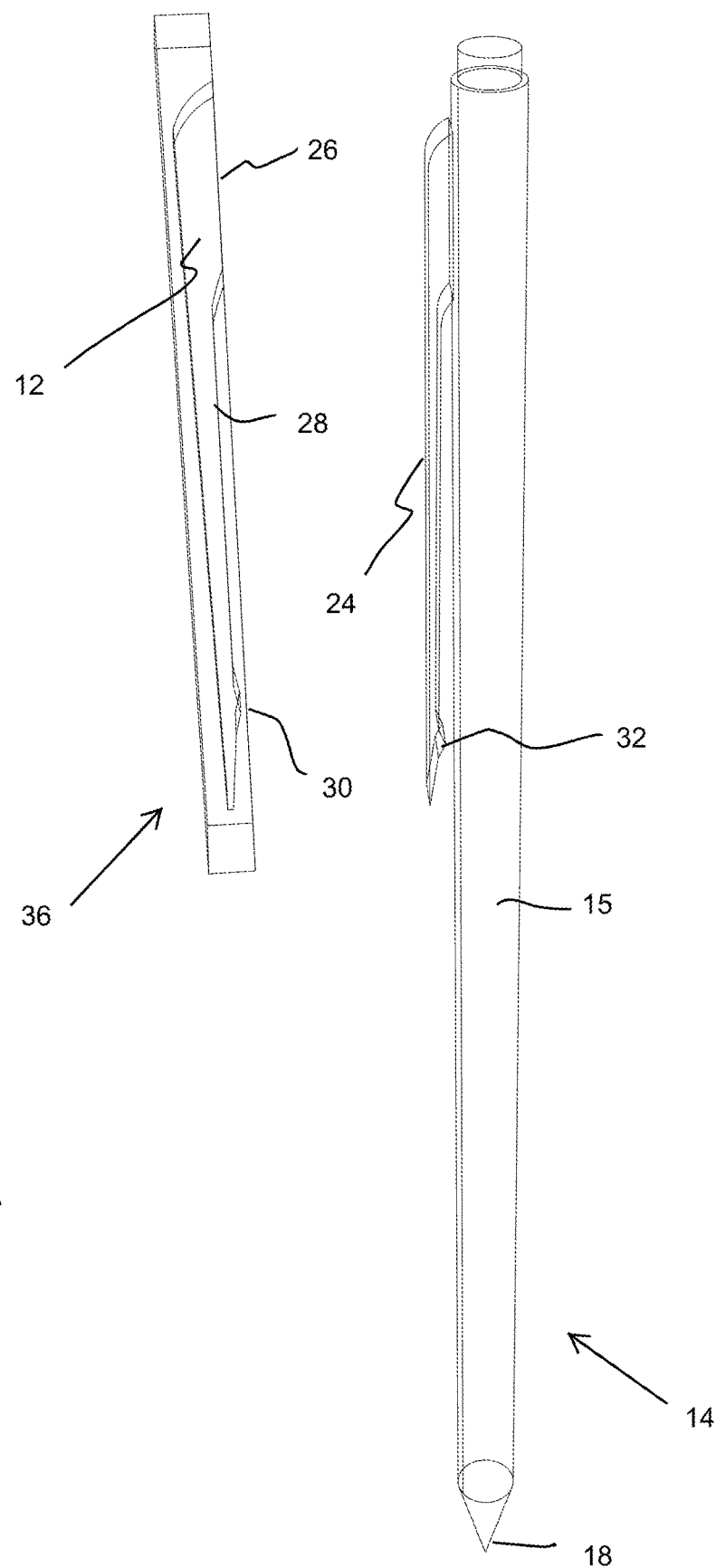
FIG. 2 shows a three-dimensional perspective side view of an electronic pen and a matching sheath where the sheath is encased into its own enclosure that may be independent from an electronic tablet or personal information display device.

FIG. 2 illustrates an exemplary embodiment of how the sheath 12 may be encapsulated in an enclosure 36 that may be completely independent of the housing 20 of the exemplary electronic tablet 10 of FIG. 1.

Figure 3:
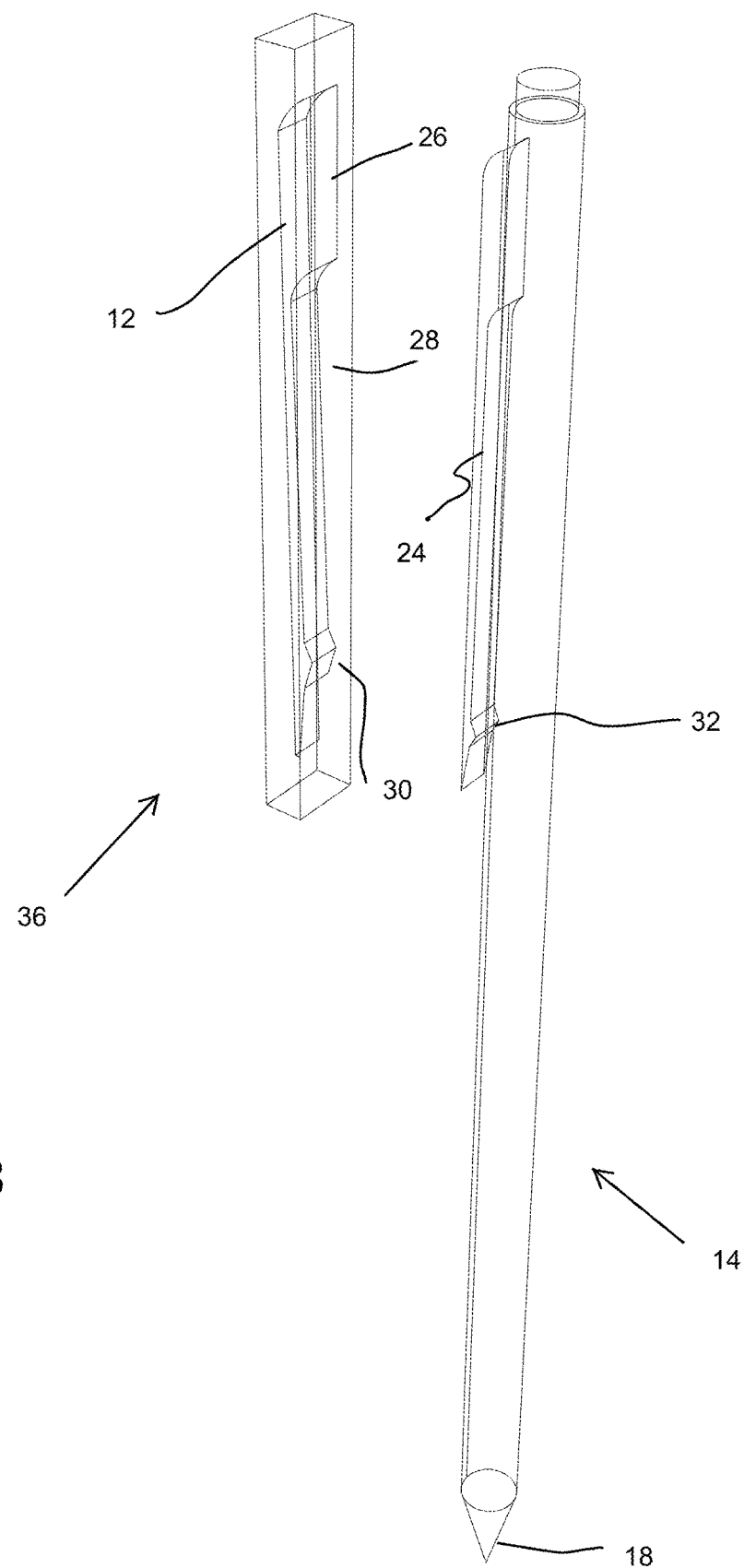
FIG. 3 shows an alternative three-dimensional perspective view of an electronic pen and a matching encased sheath that reveals an opening for the encased sheath to receive the clip of an electronic pen that uses a triangular protrusion at the tip of the clip for latching the pen to the sheath.

FIG. 3 shows an alternative three-dimensional perspective view of an electronic pen 14 and a matching encapsulated sheath 12 that reveals an opening 26 for the encased sheath 12 to receive the clip 24 of an electronic pen 14 that uses a triangular protrusion 32 at the tip of the clip for latching the pen 14 to the latch 30 of the sheath 12.

Figure 4:
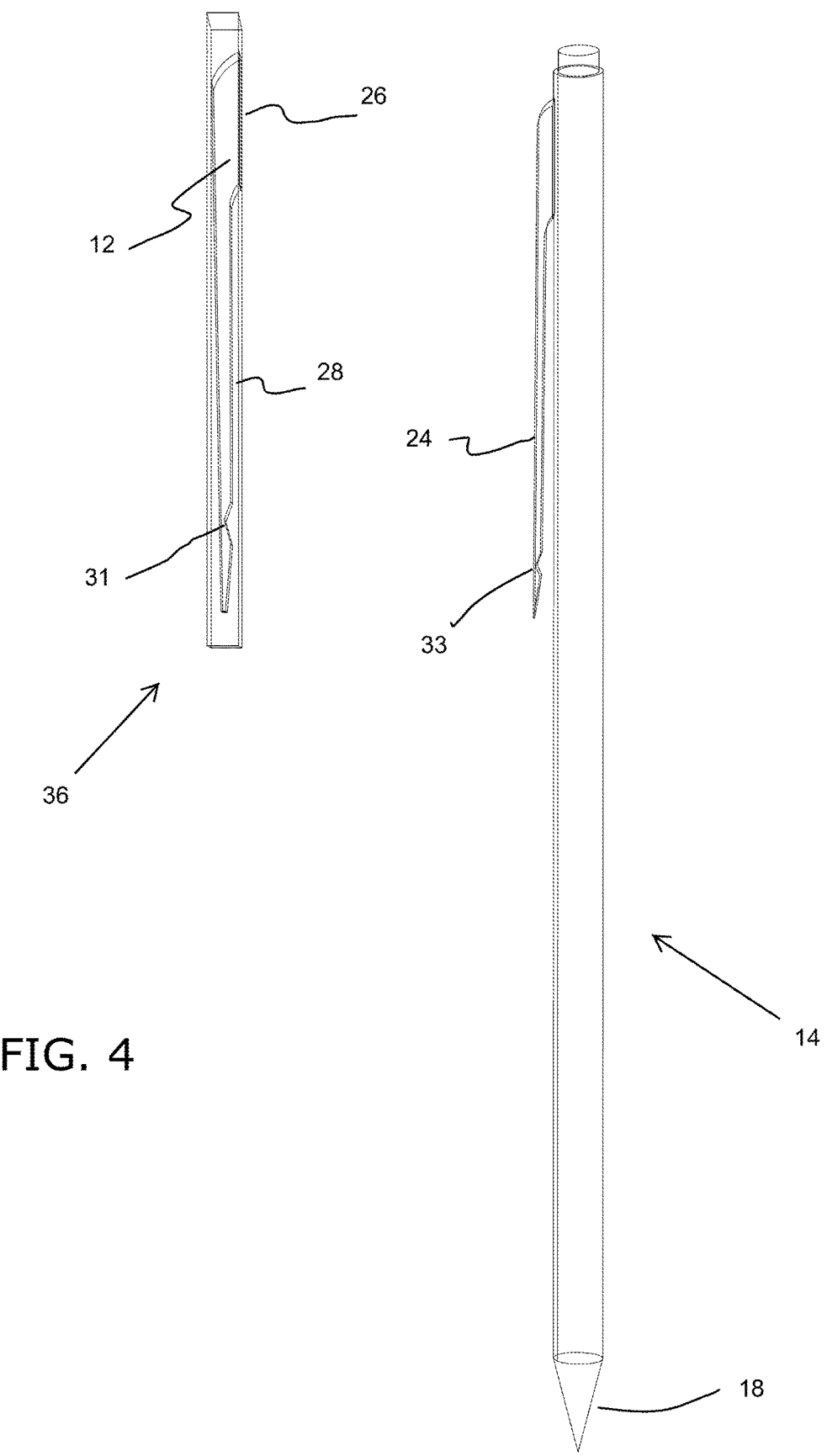
FIG. 4 shows an alternative three-dimensional perspective side view of an electronic pen with an encapsulated matching sheath that uses an inverse magnetic locking mechanism with a depression rather than a protrusion at the tip of the clip for latching the pen to the sheath.

FIG. 4 shows an alternative three-dimensional perspective side view of an electronic pen 14 with an encapsulated matching sheath 12 that uses an inverse magnetic locking mechanism with a depression 33 rather than a protrusion at the tip of the clip for latching the pen 14 to the latch 31 of sheath 12.

Figure 5:
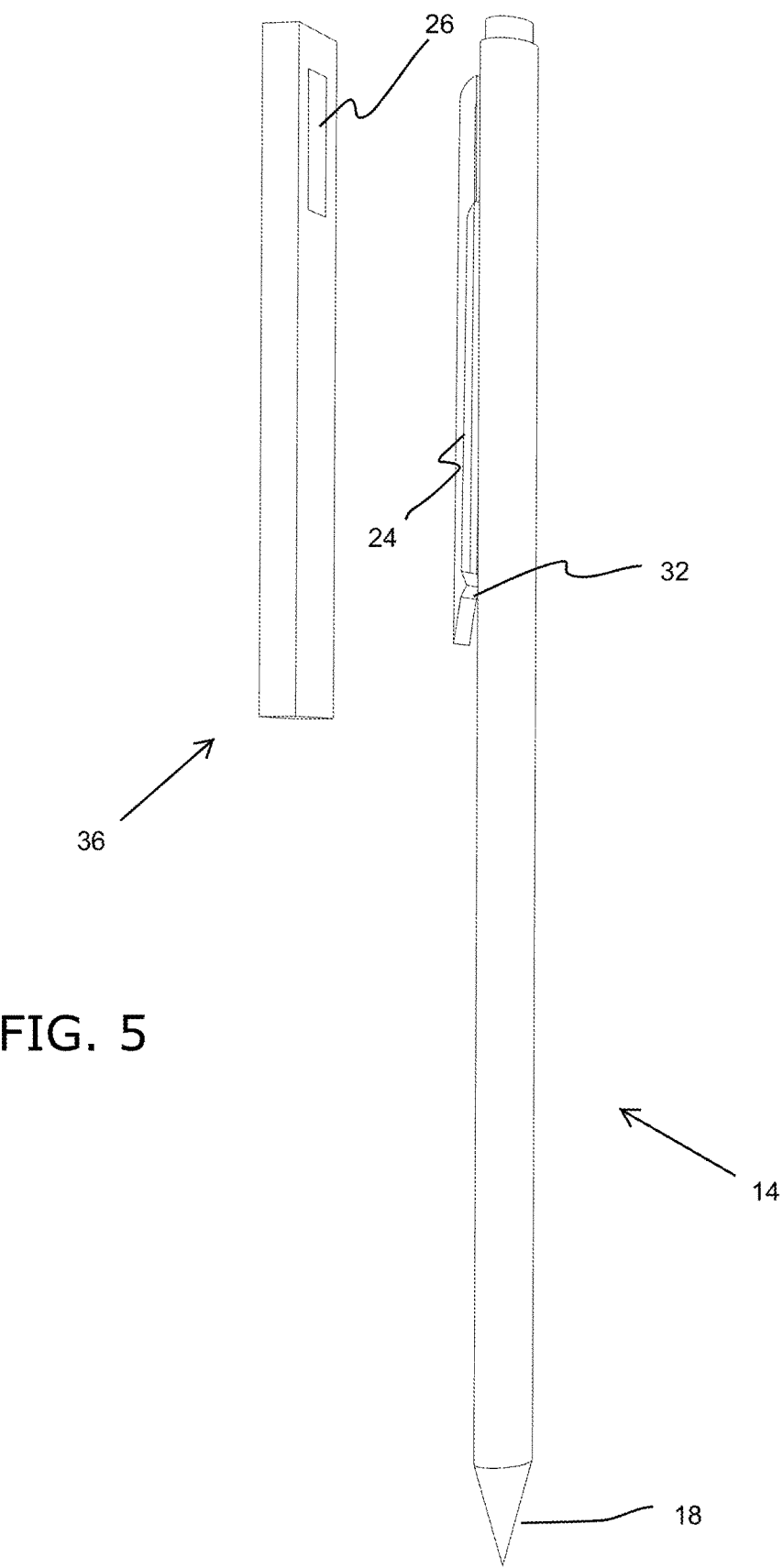
FIG. 5 shows an alternative three-dimensional perspective view of an electronic pen and matching encapsulated sheath that highlights the simplicity of the opening of the encapsulated sheath.

FIG. 5 shows an alternative three-dimensional perspective view of an electronic pen 14 and matching encapsulated sheath that highlights the simplicity of the opening 26 of the encapsulated sheath.

Figure 6:
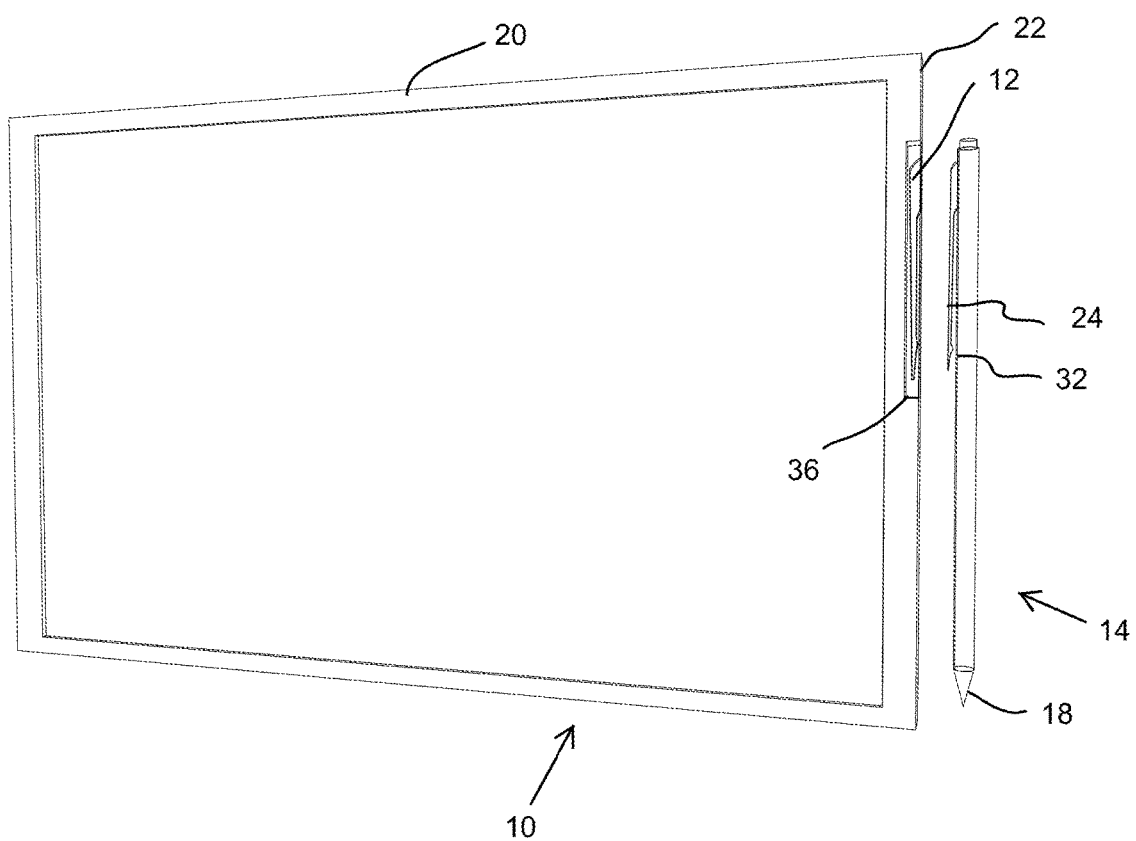
FIG. 6 illustrates how the encapsulated sheath can be fitted in the case of an electronic tablet or a personal information display and input device, or into the protective case of an electronic tablet or a personal information display and input device.

FIG. 6 illustrates a three-dimensional perspective view of how the independent sheath enclosure 36 can be fitted into the case 20 of an electronic tablet or personal information display device 10, or into the protective case of an electronic tablet or a personal information display device. The independent sheath enclosure 36 may be attached to the side edge 22 of the tablet computer 10 by mechanical means or by gluing it directly into the side edge 22 of the tablet computer.

Figure 7:
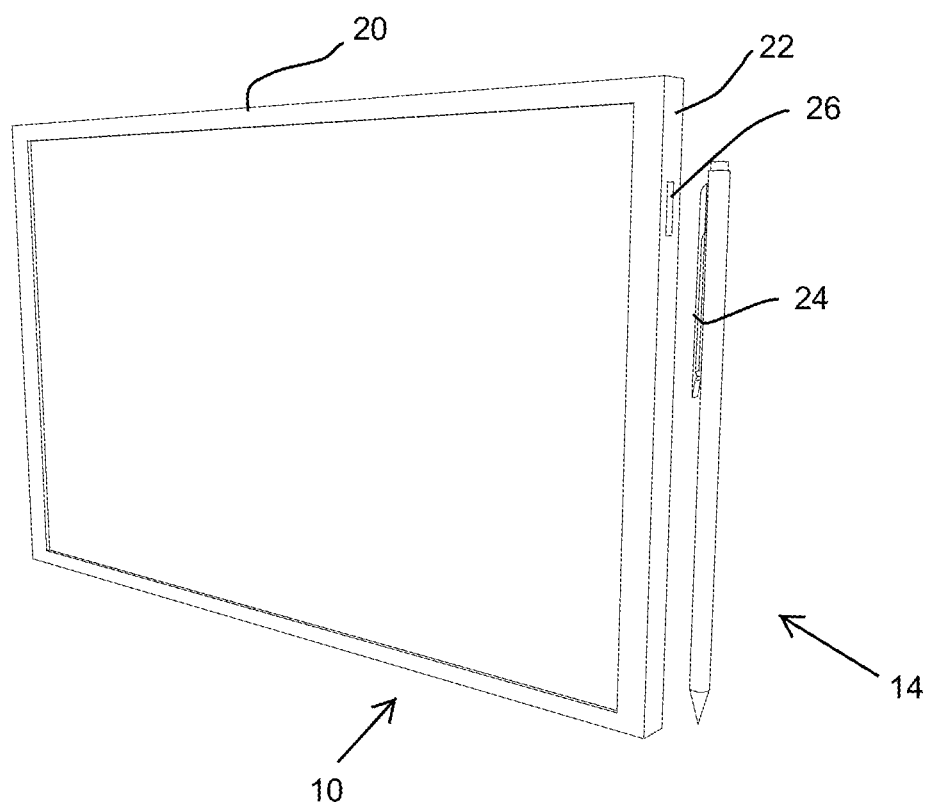
FIG. 7 illustrates a three-dimensional perspective view of an encapsulated sheath that is fully integrated into the case of an electronic tablet or personal information display and input device, or into the protective case of an electronic tablet or personal information display and input device.

FIG. 7 illustrates an alternative three-dimensional perspective view of an encapsulated sheath that is fully integrated into the case 20 of an electronic tablet 10 that reveals the opening 26 of the encased sheath for receiving the clip 24 of electronic pen 14.

Figure 8:
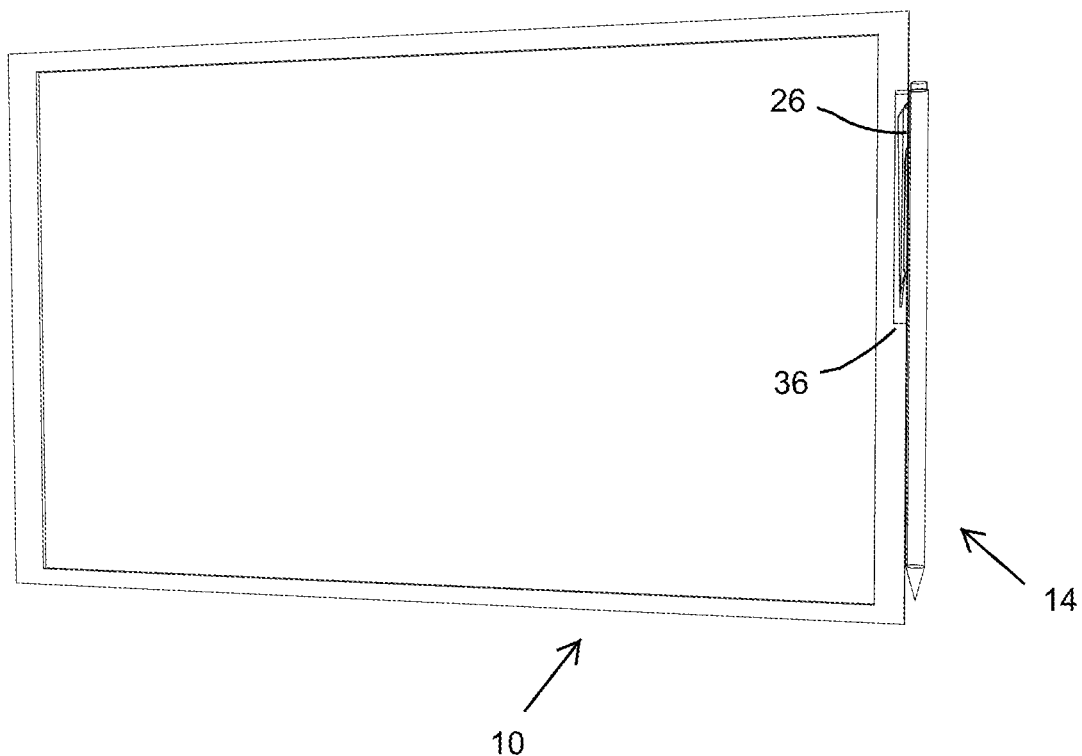
FIG. 8 illustrates a three-dimensional perspective view of an electronic pen coupled to an encapsulated sheath seated on the side of an electronic tablet or personal information display and input device, or inside the protective case of an electronic tablet or personal information display and input device.

FIG. 8 illustrates yet another three-dimensional perspective view of an electronic pen 14 coupled to an independent sheath enclosure 36 that is seated on the side of an electronic tablet or personal information display device 10, or inside the protective case of an electronic tablet or personal information display and input device 10.

Figure 9:
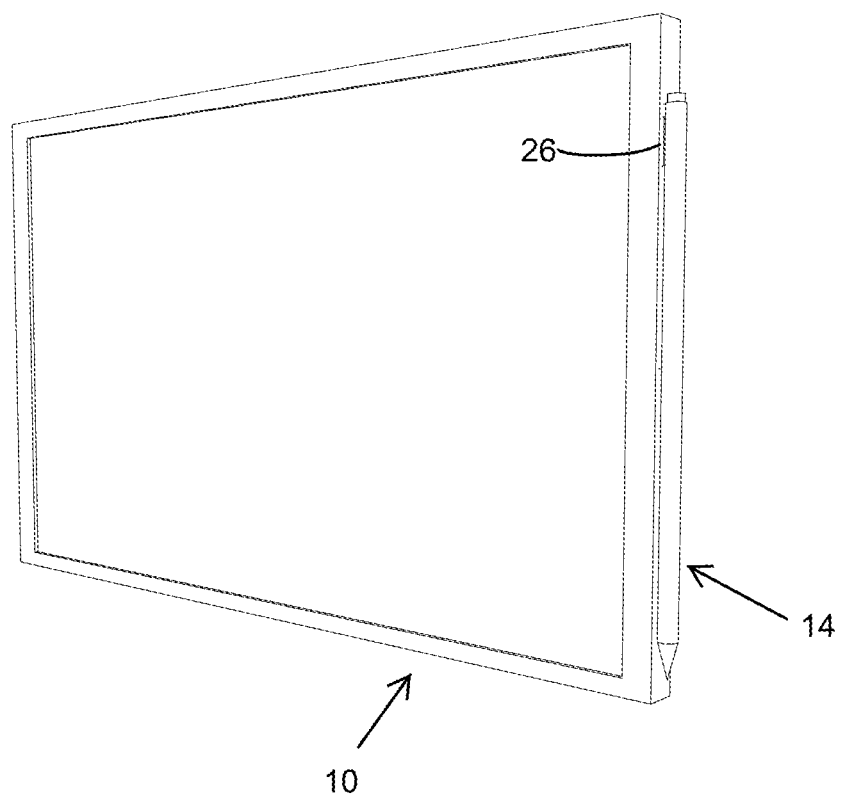
FIG. 9 illustrates an alternative view of a three-dimensional perspective view of an electronic pen coupled to an encapsulated sheath seated on the side of an electronic tablet or personal information display and input device, or inside the protective case of an electronic tablet or personal information display and input device.

FIG. 9 illustrates yet another alternative three-dimensional perspective view of an electronic pen 14 coupled to a sheath seated on the side of an electronic tablet or personal information display and input device 10, or inside the protective case of an electronic tablet or personal information display and input device, though the opening 26 of a fully integrated or independently encapsulated sheath 12.

The invention may be embodied as a sheath with a latch; the latch may be magnetic or mechanical, or both. The sheath may be open on both ends, or closed on one end; it may be shorter than the length of the clip, about equal in size, or longer; it may be integrated into the side edge of the housing for the tablet computer (or a protective case of an electronic tablet or personal information display and input device), or encapsulated in an enclosure that may be completely independent of the housing of the exemplary electronic tablet (or a protective case of an electronic tablet or personal information display and input device).

While exemplary embodiments of the invention are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An elongated sheath configured to receive at least a portion of a clip attached to a body of an electronic pen, pencil, or stylus, the elongated sheath comprising:
    an elongated chamber within a housing or a protective casing of an electronic display or tablet device, wherein the elongated chamber is adjacent an edge of the housing or casing and extends parallel to the edge;
    an opening to the elongated chamber extending through the edge of the housing or casing, wherein the opening is configured to receive the clip and allow the at least a portion of the clip to slide into the elongated chamber, and
    a latch within the elongated chamber configured to slideably engage a latchable portion of the clip,
    wherein the elongated chamber is shorter in length than the body of the electronic pen, pencil, or stylus.

2. The elongated sheath of claim 1 wherein the latch is a mechanical latch.

3. The elongated sheath of claim 1 wherein the latch is a magnetic latch.

4. The elongated sheath of claim 1 wherein the elongated chamber is shorter than the clip but at least as long as the latchable portion of the clip.

5. The elongated sheath of claim 1 wherein the elongated chamber is longer than the clip.

6. The elongated sheath of claim 1 wherein the elongated chamber is the same length as the clip.

\* \* \* \* \*